United States Patent Office.

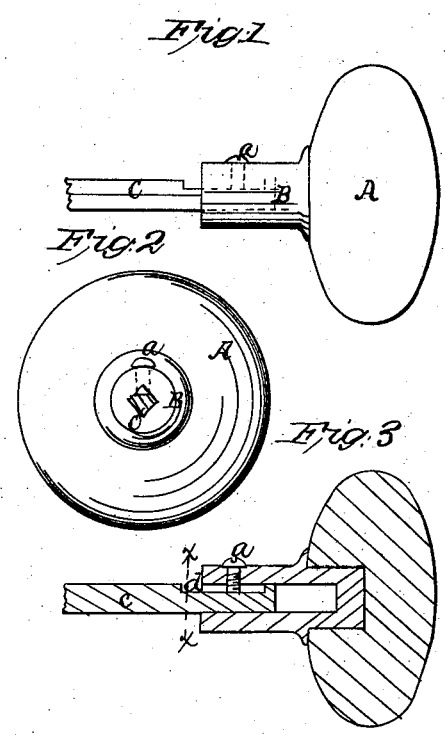

WILLIAM H. ANDREWS, OF NEW HAVEN, CONNECTICUT, ASSIGNOR TO BURTON MALLORY, OF SAME PLACE.

Letters Patent No. 77,344, dated April 28, 1868.

IMPROVEMENT IN ATTACHING DOOR-KNOBS TO SPINDLES.

*The Schedule referred to in these Letters Patent and making part of the same.*

TO ALL WHOM IT MAY CONCERN:

Be it known that I, WILLIAM H. ANDREWS, of New Haven, in the county of New Haven, and State of Connecticut, have invented a new Improvement in Extension-Knobs; and I do hereby declare the following, when taken in connection with the accompanying drawings, and the letters of reference marked thereon, to be a full, clear, and exact description of the same, and which said drawings constitute part of this specification, and represent, in—

Figure 1, a side view.

Figure 2, a section of the spindle on line $x\,x$, looking towards the knob; and in Figure 3, a longitudinal central section.

This invention relates to an improvement in the manner of securing the knob to its spindle, whereby it may be readily adjusted to different thickness of doors without the intervention of the washers in general use; and consists in the arrangement of the set-screw, so as to pass through the neck of the knob into one of the angles of the opening in the neck, formed so as to receive the spindle, and so as to bear upon one angle of the spindle, and force the opposite angle of the spindle into the corresponding angle of the neck of the knob, so as to wedge the said opposite angle hard down into the neck of the knob, and so as to hold the one firmly upon the other at whatever point on the said spindle the screw is set down.

To enable others to construct my improvement, I will proceed to describe the same as illustrated in the accompanying drawings.

A is a knob, attached to its neck B in the usual manner, and the neck B also constructed in the usual manner, save that the screw $a$ is inserted so as to pass through one of the angles of the said knob, as seen in fig. 2. The spindle C is of the ordinary square bar, one end secured to the fixed knob in the usual manner, near the other end of the said spindle, and upon one angle a portion is cut away, as at $d$, fig. 3, and as seen in section, fig. 2, so as to form a flat surface upon the said angle, and so that when the spindle is inserted into the neck, as seen in the drawing, and the screw $a$ turned down on to the said flat surface, it wedges the opposite angle firmly into the neck of the knob, and then the large bearing-surface, which is given between two of the sides of the spindle and the neck, creates so much friction, that at whatever point the screw is turned down, there the knob will be securely held.

The flattened surface is parallel with the axis of the spindle from end to end, so that the screw is turned in to the same depth at any point on the surface.

I have represented and described one angle of the spindle as being flattened, and this I believe to be the best, cheapest, and most convenient arrangement, but yet any arrangement by which the bearing of the screw may be made to come upon one angle, so as to bear the opposite angle into the neck, as described, fully accomplishes the full object and intent of my invention, and it may be done by fitting a saddle beneath the screw, or it may be a hardened screw with a flat point, so as to bear directly upon the upper angle.

This adjustment avoids all necessity of washers or other device, and is extremely simple, and cheaper in its construction than any other adjustment known.

Having thus fully described my invention, what I claim as new and useful, and desire to secure by Letters Patent, is—

Forming upon one angle of the spindle a flat surface parallel with the axis of the spindle, combined with a set-screw in the neck of the knob, so as to secure the knob to the spindle, substantially as set forth.

WM. H. ANDREWS.

Witnesses:
JOHN E. EARLE,
A. J. TIBBITS.